W. P. WARREN.
SCRAPER.
APPLICATION FILED JUNE 15, 1908.

No. 900,626.

Patented Oct. 6, 1908.

3 SHEETS—SHEET 1.

Witnesses
C. D. B. Brown.
C. H. Griesbauer.

Inventor
Wm. P. Warren,
By H. B. Willson & Co.
Attorneys

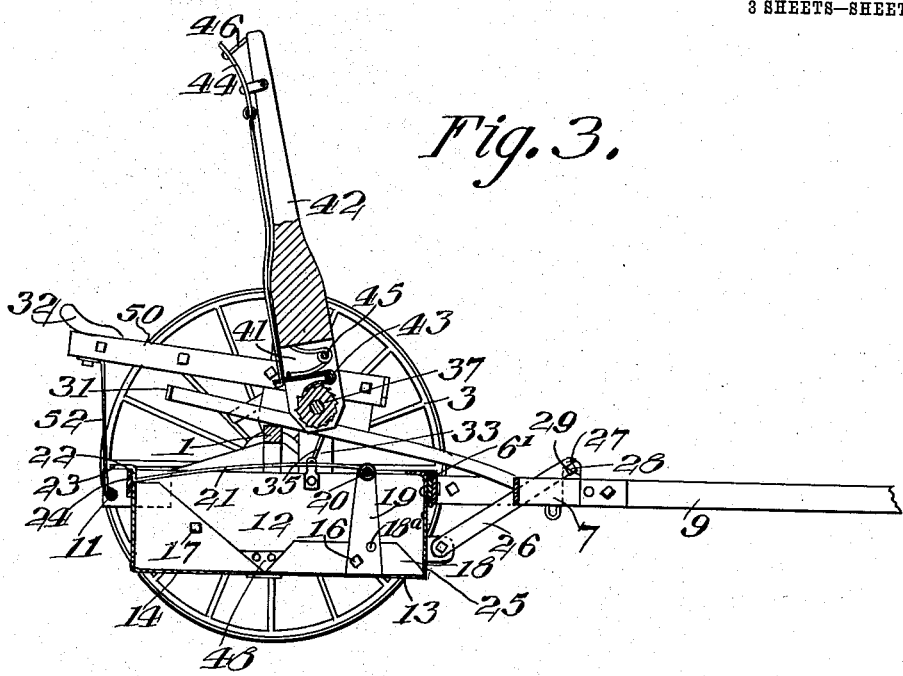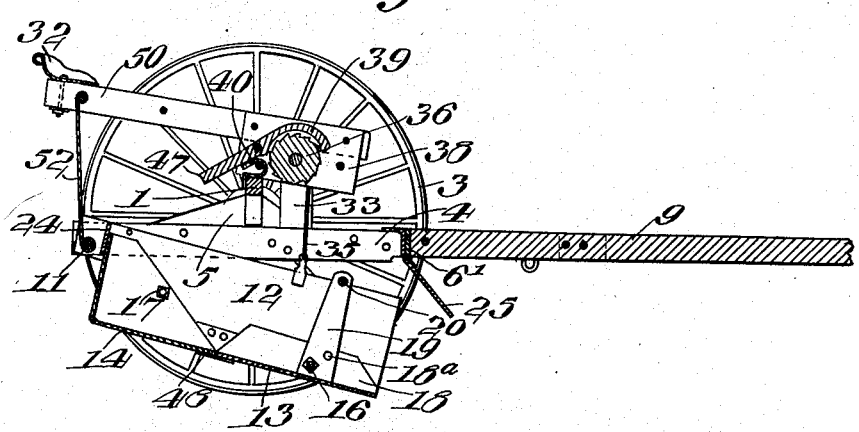

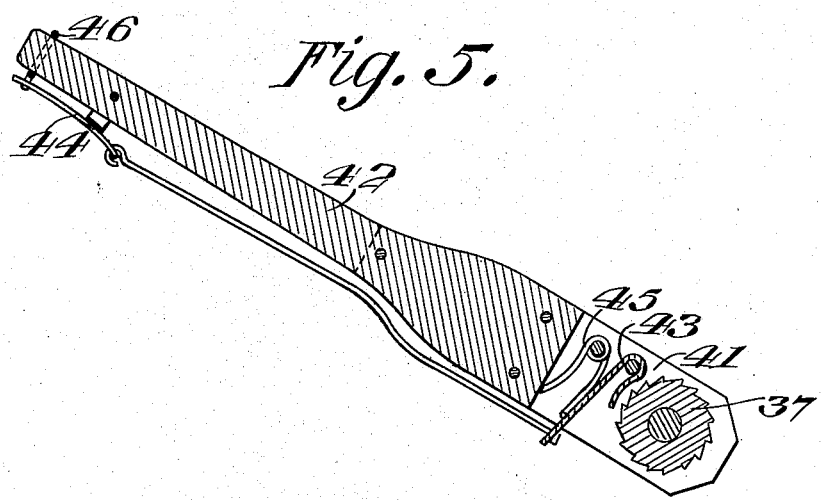
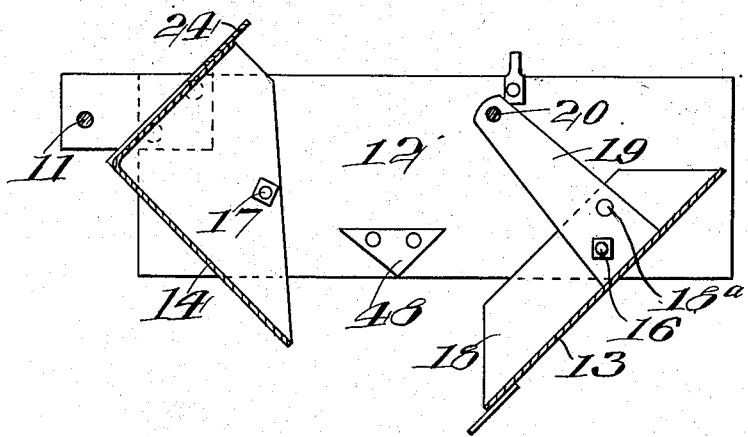

UNITED STATES PATENT OFFICE.

WILLIAM P. WARREN, OF SHERIDAN, ILLINOIS.

SCRAPER.

No. 900,626.    Specification of Letters Patent.    Patented Oct. 6, 1908.

Application filed June 15, 1908. Serial No. 438,617.

*To all whom it may concern:*

Be it known that I, WILLIAM P. WARREN, a citizen of the United States, residing at Sheridan, in the county of Lasalle and State of Illinois, have invented certain new and useful Improvements in Scrapers; and I do declare the following to be a full, clear, and exact description of the invention, such as will enable others skilled in the art to which it appertains to make and use the same.

My invention relates to scrapers, and particularly to that type which has means for raising and lowering their scoop sections and for transporting the scraped dirt for a considerable distance.

The object of the invention is the provision of a device of this character by which the dirt may be scooped in the body of the device and the body raised so that the dirt may be transported for a considerable distance, as in a cart without danger of spilling.

A further object of the invention is the provision of means for dumping the device without lowering the scoop body into scooping position.

A still further object of the invention is the provision of means for locking the scoop sections in supporting position and for raising, lowering and locking the front gate.

With these and other objects in view, the invention consists of certain novel features of construction, combination and arrangement of parts, as will be more fully described and particularly pointed out in the appended claims.

Figure 1:
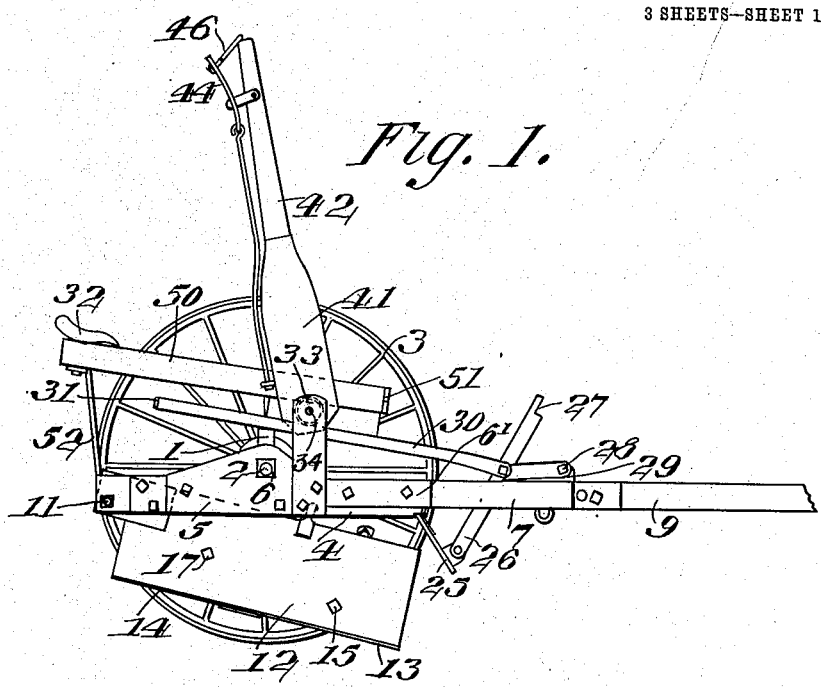
Figure 2:
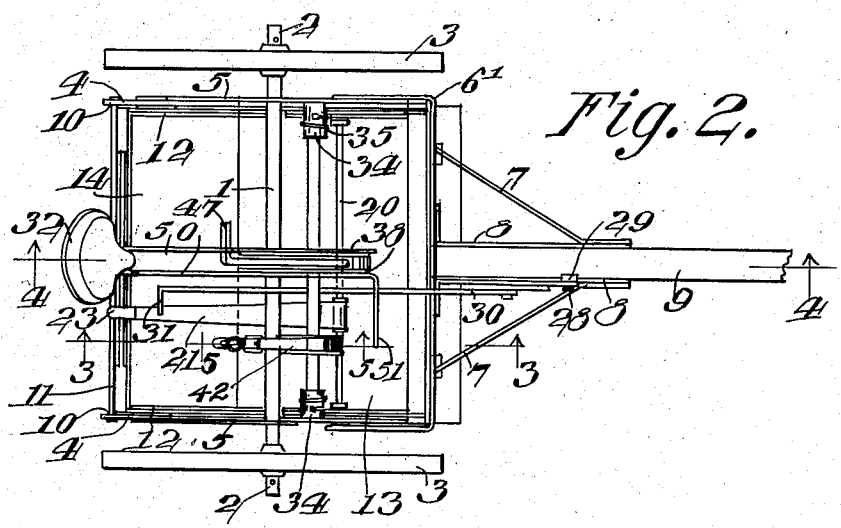

In the accompanying drawings, Figure 1 is a side elevation with one of the supporting wheels removed, Fig. 2 is a top plan view, Fig. 3 is a vertical section on the line 3—3 of Fig. 2, Fig. 4 is a vertical section on the line 4—4 of Fig. 2, Fig. 5 is a detail vertical section on the line 5—5 of Fig. 2, and Fig. 6 is a vertical section showing the scoop sections in dumping position.

Referring more especially to the drawings, 1 represents an axle which has the off-set stub ends 2, upon which the supporting wheels 3 are mounted. Secured to this axle is a frame which comprises side plates 4, to which are connected the side plates 5, having squared apertures 6, to engage the off-set end 2 of the axle. The side plates 4 have connected to their forward ends the U-shaped front plate 6' and the draft members 7 and 8, the former extending diagonally forward, and the latter extending directly forward to be engaged with the pole 9. The side plates 4 extend rearwardly back of the axle where they are apertured at 10, to receive the shaft 11, upon which is journaled the side plates 12, of the scoop sections. These scoop sections which are numbered 13 and 14 are pivoted to the plate as at 15 and 16, and the latter comprises an L-shaped trough with flanged sides through which the pivotal bolts 17 pass. The former scoop section 13 comprises a flat sheet of metal having flanged sides 18, through which the pivot bolts 18ª, which secure the flange section 13 to the side plates 12 pass, also through vertical lever arms 19, which are connected by the rod 20. Pivoted to the rod 20 is a locking arm 21, having at its rear end a right angular bend 22, and a foot piece 23, which is adapted to engage the upper edge 24, of the scoop section 14, so as to hold the sections in alinement when in position to be used as a cart, or as a scoop.

In order to hold the dirt within the device when transporting it for long distances I hinge to the frame member 6 a door 25, which has pivoted to its front face a locking lever 26, having at its opposite end a notch 27, adapted to engage the squared head of the bolt 28, passing through the lug 29, upon the pole 9. Pivoted intermediate the length of the locking lever 26, is a release lever 30, which has its other end pivotally connected to the lug 29. The pivotal bolt which secures the release lever to the locking lever also holds a manipulating handle 31, which extends back adjacent the operator's seat 32. When this lever is pulled in a rearward direction and depressed, fulcrumed upon the axle 1 the door 25 is raised through the operating lever 26. When the door is closed and the notch in engagement with the lug 29 the weight of the dirt upon the door will only tend to hold it more securely in place. In closing the front door, the lever or manipulating handle 31 is moved forward and in a slight upward direction which forces the link 30 downwardly, thus acting with the rear end of the locking lever 26 to form a toggle lever which forces the door to closed position.

Extending vertically from the side members 4 are a pair of pedestals 33, in which is journaled the winding drum 34, having flexible connections 35, with the side members 12, so as to raise and lower them when necessary. In order to adjust the height of the scoop sections I provide a pair of ratchet wheels 36 and 37, the former of which is adapted to prevent the drum from unwinding, and the latter of which is adapted to wind the drum when operated, as will now be described. The ratchet 36 is journaled between two plates 38, which have pivoted therebetween a pawl 39, which is adapted to engage the ratchet and be held in position by a spring 40. The latter wheel 37 is secured between the side plates 41 of the lever 42, and is operated by the pawl 43, controlled as is usual by the hand lever 44, and held in normal position by the spring 45. The upper end of the hand lever is provided with a loop 46, by which the pawl may be held disengaged. Upon the forward movement of the lever 42, the pawl rides idly over the ratchet wheel 37, and upon the backward movement thereof engages the ratchet and turns the drum so as to wind up the flexible connections and thereby raise the scoop sections. When it is desired to release the drum so as to lower the shafts the loop 46 is engaged with the handle of the lever so as to release the pawl from the ratchet and the foot piece 47 of the pawl 39 is depressed allowing the drum to unwind and the scoop to drop to the scooping position. After sufficient dirt has been scooped upon the sections 13 and 14 they may be raised by operating the lever, as before described, the door 25 being preferably open at the time and subsequently closed. When it is desired to dump the device the door 25 is opened by drawing backward and depressing the lever 31 and releasing the locking arm 21, which frees the sections and allows them to drop by the weight of the dirt in the scoops. In order to limit the inward movement of the scoops I provide V-shaped lugs 48, connected to the sides 12 so as to be in the path of the scoop when raised.

Riveted to the outside of the plates 38 and extending rearwardly therefrom are two parallel seat supporting members 50, upon which the seat 32 is supported. The right hand one of these seat supporting members is extended forwardly and is provided with a right angular extension 51, which acts as a stop for the lever 42. The rear end of the seat supporting member 50 is provided with a brace rod 52, which extends down from underneath the seat to the shaft 11, and thereby braces the members 50.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. The combination with a wheeled support, of a scoop frame carried thereon, scoop members carried by said frame, means to raise and lower the scoop frame, and means to lock the scoop sections in operative position.

2. The combination with a wheeled support, of a scoop frame pivoted thereto, means for raising and lowering said scoop frame, a pair of scoop sections pivotally mounted upon the frame, means to lock said scoop sections in operative position, and means hinged to the front of the support for closing the front of the frame.

3. The combination with a wheeled support, of a scoop frame pivoted to said support, a pair of scoop sections pivotally mounted upon said frame, means for holding the scoop sections in operative position with their bottoms alined, means for raising and lowering the scoop frame and its associated sections, means for closing the front of said scoop frame, and means for operating said closing means.

4. The combination with a wheeled support, of a scoop frame pivotally secured thereto, a pair of dumping scoop sections pivotally mounted upon the scoop frame and having their inner edges meeting in the center of the frame, means for limiting their inward movement, means for locking them in normal scooping position, means to raise the scoop frame and associated sections to normal horizontal position, means to close the front of the scoop frame, means to operate said controlling means, and a self operated lock carried by said operating means.

In testimony whereof I have hereunto set my hand in presence of two subscribing witnesses.

WILLIAM P. WARREN.

Witnesses:
JOHN D. MARSHALL,
GEO. H. M. JONES.